Patented Dec. 2, 1952

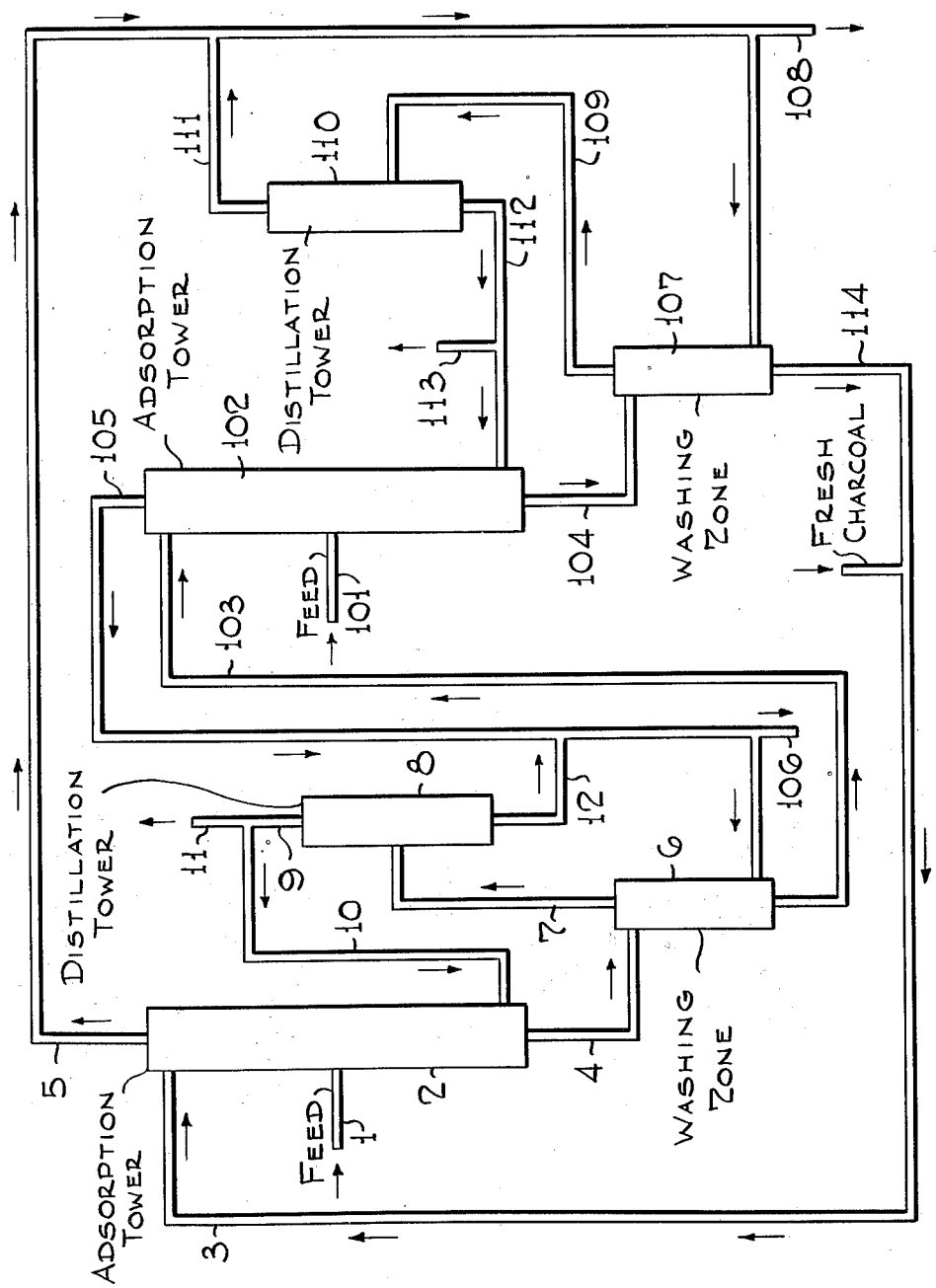

2,620,363

UNITED STATES PATENT OFFICE 2,620,363

METHOD OF SEPARATING NORMAL PARAFFINS FROM ISOPARAFFINS BY A SOLID ADSORPTION PROCESS

Henry J. Hibshman, Plainfield, N. J., assignor to Standard Oil Development Company, a corporation of Delaware Application September 29, 1950, Serial No. 187,445

2 Claims. (Cl. 260—676)

This invention relates to the novel process of separating hydrocarbons and, more particularly, it relates to a novel method of carrying out an adsorption process wherein complete regeneration of the adsorbent is avoided.

It is well known that solid adsorbents, such as carbon or silica gel, may be used to separate hydrocarbon mixtures. However, all of the prior art processes have the disadvantage that at some point in the cycle of separations it becomes necessary to completely free the solid adsorbent from the adsorbed component. This regeneration process usually involves a very high temperature desorption or steam stripping operation.

It has now been found that this high temperature desorption or steam stripping operation may be easily avoided by carrying out the solid adsorption process using two adsorption stages, each of which operates on a different boiling feed stock. The adsorbent with the adsorbed component from each stock is washed by means of the filtrate derived from the other feed stock.

The manner in which the present process is carried out will be fully understood by the following description when read with reference to the following drawing which is a diagrammatic view in elevation.

Referring now to this drawing, a mixture of normal pentane and isopentane is fed thru line 1 into tower 2 into the top of which activated coconut charcoal is introduced through line 3. The charcoal and hydrocarbon mixture passes countercurrently through the adsorption tower 2, so that the normal pentane in the feed is adsorbed on the charcoal, which is removed from the bottom of the tower through line 4 as a slurry. Isopentane passes out of the top of the tower, as filtrate, through line 5 and a portion is eventually withdrawn from the system through line 108. The slurry of charcoal containing adsorbed normal pentane is passed into washing zone 6, where it contacts a stream of isohexane, obtained in a manner to be described below.

A feed stock consisting of a mixture of normal hexane and isohexane is introduced through line 101 into the midsection of adsorber 102 and passes countercurrently to activated coconut charcoal, containing isohexane adsorbed thereon and introduced through line 103. The normal hexane in the feed stock to tower 102 selectively displaces the isohexane previously adsorbed on the charcoal and is removed together with the charcoal thru line 104. The isohexane displaced from the charcoal is removed from the adsorption tower 102 through line 105 and a portion thereof introduced into one end of washer 6, where it is passed countercurrently to charcoal containing the adsorbed normal pentane, the remainder of the isohexane is removed through line 106. If desired the temperature in washing zone 6 may be adjusted sufficiently high so that the selectivity of the charcoal for separating the normal pentane from the isohexane is essentially zero, with the result that a portion of the isohexane and all the normal pentane pass out one end of the washing zone 6 by line 7. This mixture of normal pentane and isohexane is introduced into an intermediate portion of distillation tower 8 within the normal pentane is separated from the isohexane by conventional distillation. The normal pentane is removed from the distillation tower 8 through line 9 and a portion thereof passed by line 10 to the bottom of adsorption zone 2 where it acts as reflux. The remainder of the normal pentane may be removed from the system through line 11. The isohexane is withdrawn from tower 8 through line 12 and returned to the washing zone 6 through line 106. Charcoal saturated with isohexane is removed from the washing zone 6, by means of line 103, and introduced into one end of adsorber 102, as described above.

Referring now to adsorption zone 102, separation in this zone is not altered in any way by virtue of the fact that the charcoal introduced through line 103 is saturated with isohexane since, if fresh charcoal were used, it would become saturated with isohexane in the top portion of this tower. Consequently, it is not necessary to strip the isohexane from the charcoal.

The feed to adsorption zone 102 is higher boiling than the feed introduced into adsorption zone 2 and the charcoal containing the less strongly adsorbed component of the feed stock introduced into tower 102, that is, the isohexane which is withdrawn from the bottom of tower 102 by line 104, is introduced into another washing zone 107 into the opposite end of which isopentane from the top of adsorption zone 2 is introduced by line 5. If desired the temperature of this washing zone may be maintained sufficiently high so that the selectivity of charcoal for separating components from the pentane feed stock is essentially zero with the result that both the adsorbate from the hexane feed stock, that is, the normal hexane, and the filtrate from the pentane feed stock, that is the isopentane, pass out the end of the treating zone into which the charcoal is introduced. Thus, a mixture of isopentane and normal hexane is withdrawn from washing zone 107 by means of line 109 and introduced into the mid-section of a second distillation zone 110, where these hydrocarbons are separated by conventional distillation. Isopentane is withdrawn from distillation tower 110 through line 111 and introduced into the isopentane recycle line 105. Normal hexane is withdrawn from distillation tower 110 through line 112 and passed to adsorption zone 102 as reflux. Normal hexane may be removed from the system through line 113.

Returning now to washing zone 107, charcoal containing adsorbed isopentane is removed from washing zone 107 through line 114 and recycled by means of line 5 to adsorption zone 2. This charcoal is thus saturated with a filtrate from the pentane feed stock, that is, the isopentane, so that it is of the same composition which it would have if it had been completely stripped and had been introduced into adsorption zone 2 as soon as it had contacted a small amount of the filtrate, that is, the isopentane being withdrawn from adsorption zone 2.

It is evident from the above description that the charcoal has undergone one complete cycle and may undergo any number of additional cycles without complete removal of all adsorbed constituents in any part of the cycle. It follows that by the process of the present invention the charcoal is never subjected to complete desorption such as that normally required in solid adsorption treating operations.

This invention has been described with particular reference to the separation of normal hydrocarbons from isohydrocarbons having the same number of carbon atoms. However, it is not limited to such types of feed stocks, but it is intended that the invention shall apply to any system of adsorption in which one component is preferentially adsorbed from another component. For example, olefins or aromatics may be separated from paraffin hydrocarbons by the use of solid adsorbents and diolefins may be separated from other hydrocarbons. Oxygenated compounds may be separated from hydrocarbons or other oxygenated compounds. The feeds may be all paraffinic as illustrated above, or one may be paraffinic and one aromatic or both may be aromatic or one or both may be naphthenic, or any other combination may be used as desired. For example, it is within the scope of this invention to separate a mixture or normal and isopentane with activated charcoal in the first stage and a mixture of benzene and paraffin hydrocarbons such as a benzene cut boiling between 165° and 180° F. with activated charcoal in the second stage. The invention resides in a two stage adsorption system in which the feed used in the second adsorption stage has a higher boiling point than that used in the first stage.

Any suitable type of adsorbent may be used. For example, charcoal, chemico coke, silica gel, bauxite, activated alumina, and the like may be used. When separating normal paraffins from isoparaffins, it may be desirable to use activated coconut charcoal of the type described in U. S. Patent No. 2,425,535, to Henry J. Hibshman. When different types of feed stocks are used it is usually desirable to use different types of adsorbents for the different feed stocks. For example, if normal and isoparaffins are separated in one stage and aromatics in the other, activated coconut charcoal is suitably used to separate the isomeric paraffins and silica gel to separate the aromatics.

While the present invention has been described in connection with a continuous process involving removal of the adsorbent from the adsorption zone as a slurry, it is within the scope of this invention to carry out the adsorption on fixed beds of the adsorbent, to discontinue feeding and wash the adsorbent in the same vessel. The mixtures to be separated may be processed in either liquid or gaseous phase. It is also within the scope of this invention to carry out the adsorption and washing stage in the presence of a finely divided adsorbent which is fluidized by the feed or stripping vapors that is through which the feed or stripping vapors are passed at such a velocity that the adsorbent is separated with a light and dense phase having an interface therebetween. The charcoal or other adsorbent may be circulated either up-flow or down-flow through the adsorption and washing equipment.

The nature and objects of the present invention having been thus fully set forth and specific examples of the same given, what is claimed as new and useful and desired to be secured by Letters Patent is:

1. Improved process for the segregation of normal paraffins from isoparaffins which comprises introducing a relatively narrow cut fraction of hydrocarbons comprising normal and iso hydrocarbons into an intermediate point of an initial adsorption zone, introducing into the top of said initial adsorption zone activated charcoal, withdrawing from the top of said initial adsorption zone a stream comprising iso hydrocarbons, withdrawing from the bottom of said initial adsorption zone the activated charcoal containing adsorbed thereon normal hydrocarbons, passing said charcoal containing said normal hydrocarbons to an initial washing zone, and contacting the same therein with a higher boiling stream comprising iso hydrocarbons, withdrawing from the top of said initial washing zone a stream comprising lower boiling normal hydrocarbons and said higher boiling iso hydrocarbons and passing said stream to an initial distillation tower wherein a separation is made between said lower boiling normal hydrocarbons and said higher boiling iso hydrocarbons, withdrawing a portion of said lower boiling normal hydrocarbons from said initial distillation zone and recycling the remainder to the bottom of said initial adsorption zone, withdrawing said charcoal containing adsorbed higher boiling iso hydrocarbons from the bottom of said washing zone and introducing the same into the top of a secondary adsorption tower, introducing as a feed stream into said secondary adsorption tower a feed fraction boiling above the feed fraction introduced into said initial adsorption tower and comprising normal and iso hydrocarbons, withdrawing from the top of said secondary adsorption tower a stream comprising said higher boiling iso hydrocarbons and removing a portion of the same from the system, introducing the remainder of said higher boiling iso hydrocarbons into the bottom of said initial washing zone, withdrawing from the bottom of said secondary adsorption tower said charcoal containing adsorbed thereon said higher boiling normal hydrocarbons and passing the same to a secondary washing zone wherein the same are contacted with a portion of said lower boiling iso hydrocarbons removed from the top of said initial adsorption tower, withdrawing overhead from said secondary washing zone a stream comprising lower boiling iso hydrocarbons and higher boiling normal hydrocarbons, passing said latter stream into a secondary distillation zone and removing overhead from said secondary distillation zone said lower boiling iso hydrocarbons and removing as a bottoms from said secondary distillation zone said higher boiling normal hydrocarbons, removing a portion of said higher boiling normal hydrocarbons from the system and recycling the remainder to the bottom of said secondary adsorption tower, removing from the bottom of said secondary washing zone a stream comprising lower boiling iso hydrocarbons adsorbed on charcoal and recycling said stream to the top of said initial adsorption zone.

2. Process as defined by claim 1 wherein said lower boiling hydrocarbon stream introduced into said initial adsorption zone comprises normal and iso hydrocarbons containing 5 carbon atoms in the molecule and wherein said higher boiling stream introduced into said secondary adsorption tower comprises normal and iso hydrocarbons containing 6 carbon atoms in the molecule.

HENRY J. HIBSHMAN.

REFERENCES CITED

The following references are of record in the file of this patent:

UNITED STATES PATENTS

| Number | Name | Date |
| --- | --- | --- |
| 2,425,535 | Hibshman | Aug. 12, 1947 |